Oct. 26, 1943.   J. C. McCUNE   2,332,584
WHEEL SLIP CONTROL MEANS
Filed Aug. 28, 1941
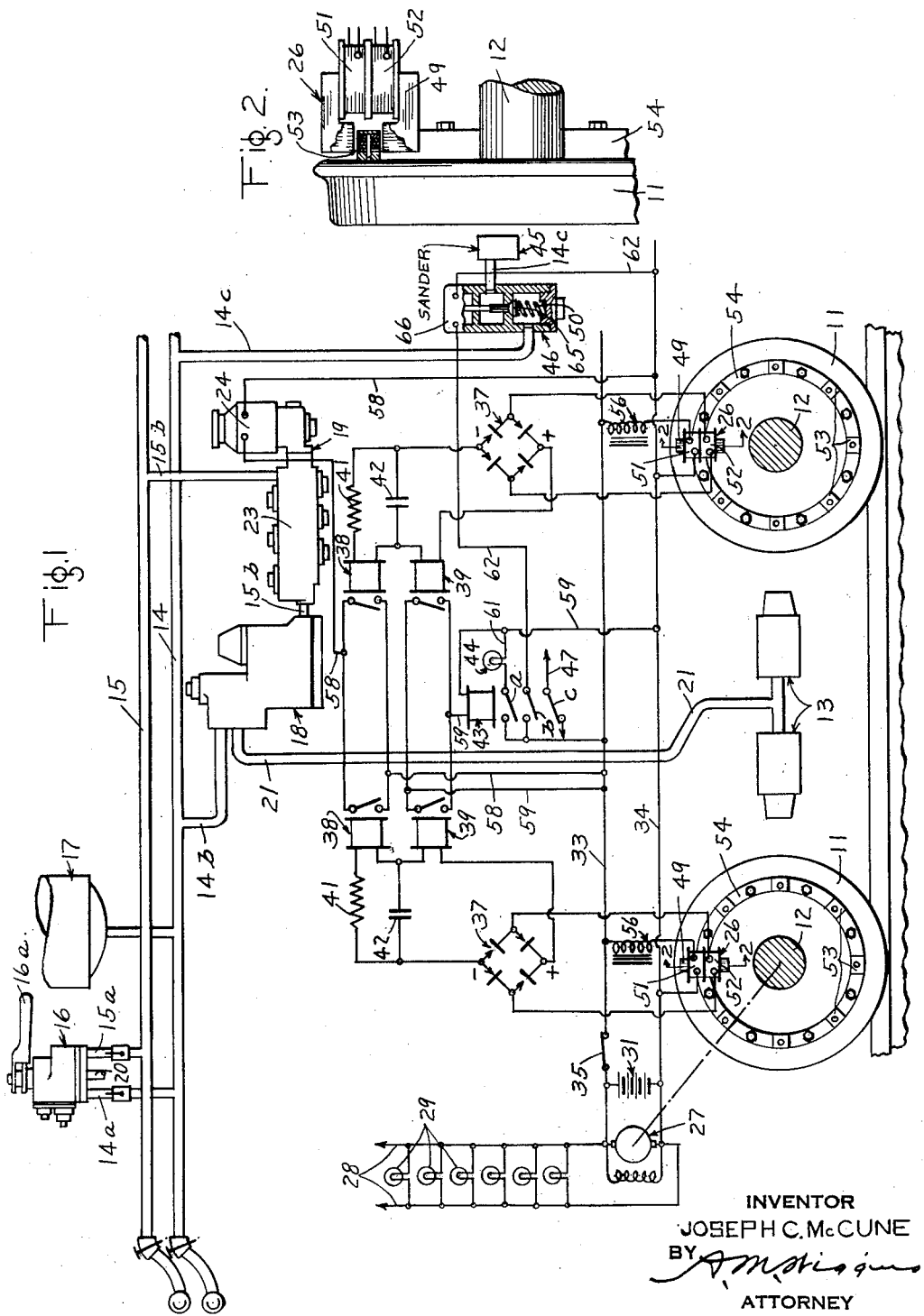
INVENTOR
JOSEPH C. McCUNE
BY
ATTORNEY Patented Oct. 26, 1943

2,332,584

UNITED STATES PATENT OFFICE 2,332,584

WHEEL SLIP CONTROL MEANS

Joseph C. McCune, Edgewood, Pa., assignor to The Westinghouse Air Brake Company, Wilmerding, Pa., a corporation of Pennsylvania Application August 28, 1941, Serial No. 408,577

15 Claims. (Cl. 192—2)

This invention relates to wheel slip control means for vehicles, such as railway cars and trains, and has particular relation to apparatus including means responsive to the slipping of the vehicle wheels for causing the slipping condition to cease.

As employed herein, the term "slipping" or "slipping condition" as applied to a vehicle wheel refers to the rotation of the wheel at a speed less than or greater than a speed corresponding to the speed of the vehicle at a given instant. Thus, if the brakes associated with the vehicle wheel are applied to a sufficient degree to exceed the adhesion between the wheel and the rail or road surface, the wheel decelerates at an abnormally rapid rate to a locked condition and slides. In such case the rotation of the vehicle wheel at a speed less than the speed corresponding to the vehicle speed is referred to as a "slipping condition." On the other hand, the application of propulsion torque to a driving wheel of the vehicle to a sufficient degree to exceed the adhesion between the wheel and the rail or road surface will cause the wheel to accelerate at an abnormally rapid rate. In such case the rotation of the vehicle wheel at a speed greater than a speed corresponding to vehicle speed is also referred to as a "slipping condition."

The term "sliding" or "sliding condition" as applied herein to a vehicle wheel is not synonymous with "slipping condition," the term "sliding condition" or "sliding" referring solely to the dragging of a vehicle wheel along a road surface or rail in a locked or non-rotative condition.

In my prior co-pending application, Serial No. 381,083, filed February 28, 1941, now Patent No. 2,283,608, dated May 19, 1942, there is disclosed apparatus including means responsive to the slipping condition of a vehicle wheel induced only by excessive braking for effecting a rapid release of the brakes associated with the slipping wheel whereby to cause the wheel to be returned to vehicle speed before decelerating to a locked condition and sliding.

It is an object of my present invention to provide apparatus which is an improvement upon that disclosed in my prior copending application and which is characterized by means responsive to the slipping of a vehicle wheel, whether induced by excessive braking or by excessive propulsion torque, for causing the slipping condition to cease.

It is another object of my invention to provide apparatus of the type indicated in the foregoing object and further characterized by means for visually indicating to the operator of the vehicle the occurrence of a slipping wheel condition induced by or produced by excessive propulsion torque.

It is another object of my invention to provide, in an apparatus of the type indicated in the foregoing objects, an arrangement for causing sanding of the rails automatically in response to the occurrence of a slipping condition of a vehicle wheel due to excessive propulsion torque whereby to aid in restoring the wheel to a non-slipping condition.

It is another object of my invention to provide, in an apparatus of the type indicated in the foregoing objects, means operative in response to the occurrence of a slipping condition of a vehicle wheel due to excessive propulsion torque applied thereto for interrupting the supply of power to the propulsion means whereby to cause cessation of application of propulsion torque to the wheel and enabling prompt restoration of the wheel to a non-slipping condition.

The above objects, and other objects of my invention, which will be made apparent hereinafter, are attained by means of apparatus subsequently to be described and shown in the accompanying drawing, wherein Fig. 1 is a simplified diagrammatic view showing a control system for a vehicle and illustrating one embodiment of my invention, and Fig. 2 is a fragmental enlarged view taken substantially on either of the lines 2—2 of Fig. 1.

Description of equipment

For simplicity, the apparatus shown in Fig. 1 is limited to the control of apparatus associated with only one four-wheel truck, it being understood that similar control apparatus is provided for other wheel trucks of the same or different cars. In the drawing, only one wheel 11 of each wheel and axle unit is shown, it being understood that a wheel similar to each of those shown is fixed to the opposite end of the axle 12 to which the wheels 11 are shown fixed.

The equipment shown in Fig. 1 includes a simplified straight-air type of fluid pressure brake apparatus including a brake cylinder 13 for each wheel and axle unit effective upon the supply of fluid under pressure thereto to cause application of the brakes, such as the standard type of clasp shoe brakes engaging the rim of the wheels, and effective upon the release of fluid under pressure therefrom to effect the release of the brakes.

As shown, fluid under pressure is supplied to the brake cylinders and released therefrom under the control of the operator by apparatus which may include a pair of train pipes 14 and 15, hereinafter referred to as the supply pipe and control pipe respectively, a manually operated brake valve 16 of well known self-lapping type, a reservoir 17 arranged to be charged with fluid under pressure by a suitable compressor not shown, a relay valve device 18, and a control valve mechanism 19.

Brake valve 16 is of the type described and claimed in Patent 2,042,112 to Ewing K. Lynn and Rankin J. Bush. Since reference may be had to the patent for details of construction and operation, the brake valve will be only functionally described herein.

With the brake valve handle 16a in its normal brake release position, fluid under pressure is exhausted from the control pipe 15 through a communication established by the valve mechanism of the brake valve between a branch pipe 15a of the control pipe and an exhaust port and pipe 20. When the brake valve handle 16a is shifted in a horizontal plane out of its brake release position into its application zone, the valve mechanism of the brake valve operates to close the exhaust communication just described and establish a communication between a branch pipe 14a of the supply pipe and the pipe 15a to cause fluid under pressure to be supplied to charge the control pipe. The valve mechanism of the brake valve is of the automatically self-lapping type and is effective to limit the pressure established in the control pipe substantially in proportion to the degree of displacement of the brake valve handle out of its normal or brake release position.

If the pressure in the control pipe 15 tends to reduce for some reason, such as leakage, the valve mechanism of the brake valve operates automatically to supply fluid under pressure thereto to maintain a pressure in the control pipe corresponding to the position of the brake valve handle. This pressure-maintaining feature will be referred to hereinafter.

The relay valve device 18 is of the supersensitive high-capacity type described and claimed in Patent 2,096,491 to E. E. Hewitt. Since reference may be had to the patent for a detailed description of the construction and operation of the relay valve device, it will be only briefly and functionally described herein. Essentially the relay valve device 18 comprises a supply valve and a release valve adapted to be operated by an operating piston or diaphragm having a control chamber on one side to which fluid under pressure is supplied from a branch pipe 15b of the control pipe and subject on the other side to the fluid pressure in a chamber, called the pressure chamber, which is connected by a pipe 21 to the brake cylinders 13. Normally the supply valve is closed and the release valve is open, thereby exhausting fluid under pressure from the brake cylinders to atmosphere. Upon the supply of fluid under pressure to the control chamber of the relay valve device, the release valve is closed and the supply valve is opened to cause fluid under pressure to be supplied from a branch pipe 14b of the supply pipe through the brake cylinder pipe 21 to the brake cylinders. When the force of the fluid pressure in the brake cylinders acting in the pressure chamber on the operating piston substantially balances the force exerted by the fluid under pressure in the control chamber, the supply valve is closed and the release valve maintained also closed, thereby establishing a pressure in the brake cylinders 13 which corresponds substantially to the pressure established in the control pipe 15.

Upon a reduction of the pressure in the control chamber, the release valve opens and exhausts fluid under pressure from the brake cylinders until a substantial balance of the fluid pressure in the pressure and control chambers is obtained, when it closes to cut off the further reduction of pressure in the brake cylinders.

The valve mechanism of the relay valve device 18 is so constructed as to operate in response to very slight variations of the pressure in the control pipe 15 and is of high-capacity so as to effect variations of pressure in the brake cylinders in accordance with rapid changes or variations of the operating fluid pressure in the control chamber.

The control valve mechanism 19 is of the type shown and described in detail in my above-mentioned copending application Serial No. 381,083, now Patent No. 2,283,608 and it will be therefore only briefly and functionally described herein. The control valve mechanism 19 comprises a main portion 23 containing a cut-off valve, a release valve and a reapplication control valve; and a magnet valve portion including a magnet valve 24 for controlling the operation of the cut-off and release valves in the portion 23.

Normally the cut-off valve is open and the release valve is closed, thereby establishing communication through the branch pipe 15b from the control pipe 15 to the control chamber of the relay valve device 18. Upon energization of the magnet winding of the magnet valve 24, the cut-off valve and the release valve are successively operated to closed and open positions, respectively, thereby cutting-off the supply of fluid under pressure from the control pipe to the control chamber of the relay valve device 18 and simultaneously exhausting fluid under pressure from the control chamber of the relay valve device at a rapid rate.

When the magnet winding of the magnet valve 24 is subsequently deenergized, the release and cut-off valves are successively restored to their closed and open positions, respectively, to cause resupply of fluid under pressure to the control chamber of the relay valve device 18. However, upon the reduction of the pressure in the brake cylinders a certain amount below the pressure in control pipe 15, the reapplication control valve was conditioned so as to restrict the rate of resupply of fluid under pressure from the control pipe 15 to the control chamber of the relay valve device 18 to a relatively slow rate. The reapplication control valve is rendered non-effective to restrict the rate of resupply of fluid under pressure to the control chamber of the relay valve device 18 after the fluid pressure restored in the control chamber of the relay valve device 18 comes within the certain amount less than the pressure in the control pipe.

According to my present invention, the equipment shown also comprises an induction generator 26 associated with each wheel and axle unit in the manner disclosed in my prior copending application Serial No. 381,083; a direct-current generator 27 illustrated as of the shunt type which may be the usual car-lighting generator, having a driving connection with an axle 12 as indicated by the broken line, for supplying current to a car-lighting circuit 28 diagrammatically indicated as including a plurality of incandescent bulbs 29; a storage battery 31 adapted to be charged by the generator 27; a pair of bus wires 33 and 34, the bus wire 33 being connected to the positive terminal of the battery 31 under the control of a conveniently located manually operated switch 35, and the bus wire 34 being constantly connected to the negative terminal of the battery 31.

According to my present invention the equipment shown further comprises a full-wave rectifier 37 for each induction generator 26, which rectifier may be of the dry disk or copper oxide type, adapted to rectify the alternating current supplied from the corresponding induction generator 26; a circuit connected across the output terminals of each rectifier 37 including two relays 38 and 39, respectively, a resistor 41 and a condenser 42; another relay 43; a device 44 which may provide an audible or visible signal, such as a buzzer, bell, or indicating lamp; a sanding device 45; and a sanding control magnet valve 46.

Considering the equipment in greater detail, each induction generator 26 comprises a C-shaped laminated magnetic core element 49 (Fig. 2) having two separate inductively related windings 51 and 52 thereon. The core element 49 may be mounted in a suitable manner inboard of a car wheel in a position to permit a plurality of circumferentially spaced magnetic elements 53 suitably secured in a non-magnetic ring 54 attached to the vehicle wheel to pass successively through the air gap between the opposite pole pieces of the magnetic core element 49 upon rotation of the car wheel.

The winding 51 of each generator, hereinafter referred to as the primary winding, is connected in series relation with a choke coil 56 across the bus wires 33 and 34.

The winding 52 of each generator, hereinafter referred to as the secondary winding, is connected across the input terminals of the corresponding rectifier 37.

With the primary winding 51 of a generator 26 energized, the successive movement of the magnetic elements 53 between the pole pieces of the magnetic core element 49 causes the flux density in the magnetic core element 49 to be alternately increased and decreased thereby causing an alternating current voltage to be induced in the secondary winding 52, the effective value of which and the frequency of which is substantially proportional to the rotational speed of the car wheel.

The choke coil 56 associated with the primary winding 51 of each generator 26 is effective to dampen the effect of the self-induced voltage in the primary winding, thereby preventing undesired disturbances or fluctuations in the voltage across the bus wires 33 and 34.

Relays 38 and 39 are standard relays of the neutral type having a winding effective when energized by a current exceeding a certain value to cause pick-up of the armature thereof, the armature being biased to its dropped-out position when the current reduces sufficiently below the pick-up current. Each relay 38 and 39 has a front contact that is a contact which is in open position when the relay is dropped-out and which is actuated to closed position when the relay is picked-up.

The windings of the relays 38 and 39 and the resistor 41 are connected in series relation across the output terminals of the rectifier 37 and the condenser 42 is connected in parallel relation to the resistor 41 and the winding of the relay 38.

The arrangement is such that as long as a car wheel rotatively accelerates or decelerates at a rate less than a certain rate, the corresponding rate of change of the output voltage of the rectifier 37 is insufficient to produce sufficient charging current to the condenser or sufficient current discharged from the condenser 42 to effect pick-up of either of the relays 38 and 39.

When the car wheel 11 accelerates rotatively at a rate exceeding a certain rate, such as ten miles per hour per second, which is not attained unless the wheel is in a slipping condition, the rate of increase of the voltage supplied by the rectifier is such that the current supplied to charge the condenser 42 is sufficient to cause pick-up of the contact of the relay 39. At such time insufficient current is supplied through the resistor 41 to cause pick-up of the contact of the relay 38.

When the car wheel 11 rotatively decelerates at a rate exceeding a certain rate, such as ten miles per hour per second, which is not attained unless the wheel is in a slipping condition due to braking, sufficient current is discharged from the condenser 42 in series through the resistor 41 and the winding of the relay 38 to cause pick-up of the contact of the relay 38. At the same time, the relay 39 is not picked-up because the current flow through the rectifier 37 in the reverse or high resistance direction is negligible.

Summarizing, it will be seen that when a car wheel 11 is decelerating at a slipping rate due to braking, only the contact of the relay 38 is picked-up. When a car wheel is accelerating at a slipping rate due to excessive propulsion torque or to restoration of a slipping wheel to vehicle speed during braking, only the contact of the relay 39 corresponding thereto is picked-up. Whenever the rate of rotative acceleration or deceleration of a wheel reduces sufficiently below ten miles per hour per second, the contacts of the relays 38 and 39 are restored to their dropped-out or open position by biasing means not shown.

The contacts of the relays 38 for the two wheel and axle units of the truck are connected in parallel relation and arranged in series relation with the magnet winding of the magnet valve 24 in a wire 58 connected at one end to the bus wire 33 and at the other end to the bus wire 34. It will thus be apparent, assuming switch 35 to be closed as it normally is, that the pick-up of either of the relays 38 establishes a circuit for energizing the magnet winding of the magnet valve 24.

In a similar manner, the contacts of the two relays 39 for the two wheel and axle units of the same truck are connected in parallel relation to each other and in series relation with the winding of the relay 43 in a wire 59 which is connected at one end to the bus wire 33 and at the other end to the bus wire 34. It will thus be apparent that upon the pick-up of either of the relays 39, a circuit is completed for energizing and consequently causing pick-up of the relay 43.

The relay 43 has three contacts designated a, b, and c respectively, contacts a and b being front contacts and contact c being a back contact. In other words contacts a and b are actuated from a normally open position to a closed position upon pick-up of the relay and contact c is actuated from a normally closed position to an open position upon pick-up of the relay.

The contact a of relay 43 is connected in series relation with the signal device 44 in a wire 61 connected at one end to the bus wire 33 and at the other end to the wire 59. It will thus be seen that upon pick-up of the relay 43 the signal device 44 is operated.

The contact b of the relay 43 is arranged in serial relation with the magnet winding of the magnet valve 46 in a wire 62 which is connected at one end to the wire 61 and at the other end to the bus wire 34. Accordingly, upon pick-up of the relay 43, the magnet winding of the magnet valve 46 is energized.

The back contact c of the relay 43 is a power-interlock contact and is effective upon the pick-up of the relay 43 to interrupt the usual circuit including a wire 47 for energizing the usual propulsion control relays (not shown) controlling the supply of power current to the propulsion motors of the vehicle or the supply of current to a magnet valve controlling the supply of steam to the cylinders of a steam locomotive.

The sanding control magnet valve 46 is of standard type having a poppet valve 65 normally biased to a seated position by a spring 50 and actuated to an unseated position in response to the energization of a magnet winding 66. When unseated, the valve 65 establishes communication through a branch pipe 14c of the supply pipe to the sander 45, whereby to cause operation of the sander to effect sanding in advance of the wheels 11. Upon seating of the valve 65 communication through the branch pipe 14c is closed and the sander 45 ceases to operate to effect sanding.

*Operation of equipment*

Let it be assumed that the car having the equipment shown in Fig. 1 is at a standstill with the reservoir 17 charged to the normal pressure carried therein, such as 100 pounds per square inch, and with the brake valve handle 16a in brake release position so that the brakes are released. When the operator desires to start the car or train, he operates a suitable propulsion controller (not shown) or in the case of a steam locomotive a steam control valve (not shown) whereby propulsion power or torque is applied to the wheels 11.

As long as the car wheels 11 accelerate rotatively at a rate less than ten miles per hour per second, the acceleration of the car or train will proceed in normal manner.

If, however, upon the application or propulsion torque to the driving wheels 11, either one or both of the wheels begin to slip, one or both of the relays 39 are correspondingly picked-up in response to the slipping condition produced by excessive propulsion torque. Due to the pick-up of one or both of the relays 39, relay 43 is correspondingly picked-up. The signal device 44 is accordingly operated to indicate the slipping condition of the wheels. At the same time, the sanding control magnet valve 45 is operated in response to pick-up of relay 43 to cause fluid under pressure to be supplied to the sander 45 to cause sanding of the rails in advance of the wheels. Such sanding is for the purpose of improving the adhesion or traction between the wheels and the rails and thereby assist in promptly alleviating the slipping condition.

At the same time also, the power-interlock circuit wire 47 is interrupted by the contact c of the relay 43, and the power current supplied to the propulsion motors or the supply of steam to the cylinders of a steam locomotive is thus promptly cut off.

Due to the combined effect of the sanding of the rails and the cut-off of propulsion torque, the slipping wheels are thus rapidly restored to a speed corresponding to car speed. It will be apparent that if the slipping condition of the wheels is permitted to continue, undesirable heat will be generated in the rim of the wheels, resulting in undue wear and possible loosening of the rim of the wheels necessitating repair or replacement of the wheels.

The equipment accordingly operates to prevent the generation of undue heat in the car wheels due to slipping produced by excessive propulsion torque.

When the slipping wheels cease to accelerate at a sufficient rate, the relays 39 are restored to their dropped-out or open position thereby causing the relay 43 to be restored to its dropped-out position. The operation of signal device 44 is accordingly terminated, the magnet winding of the magnet valve 46 deenergized and sanding by the sander 45 automatically terminated, and the power-interlock circuit 47 automatically reestablished.

It will be apparent that the above operation caused by slipping of the wheels in response to excessive propulsion torque is the same whether the wheels are rotating in one direction or the opposite direction.

Let it now be assumed that the car or train has attained the desired traveling speed and that the operator desires to bring the car or train to a stop. To do so, the operator cuts off the supply of propulsion current to the propulsion motor (or in the case of a steam locomotive the supply of steam to the cylinders) and then shifts the brake valve handle 16a into its brake application zone an amount corresponding to the desired degree of application of the brakes.

The control pipe 15 is accordingly charged to a corresponding pressure such as fifty pounds per square inch and fluid under pressure flows through the branch pipe 15b to the control chamber of the relay valve device 18 to cause operation of the relay valve device 18 to supply fluid under pressure from the supply pipe 14 to the brake cylinders 13. The brakes are accordingly applied in accordance with the pressure of fluid established in the brake cylinders.

As long as the car wheels 11 do not slip due to braking, the operator may either increase the pressure or decrease the pressure in the brake cylinders to correspondingly increase or decrease the degree of application of the brakes.

If, however, one or both of the car wheels 11 should begin to slip during an application of the brakes, the corresponding relay or relays 38 are picked-up. The pick-up of the contact of either of the relays 38 is effective to establish the circuit for energizing the magnet winding of the magnet valve 24 of the control valve mechanism 19. This results in a cut-off of the supply of fluid under pressure from the control pipe to the control chamber of the relay valve device 18 and the rapid exhaust of fluid under pressure from the control chamber of the relay valve device 18. The relay valve device 18 correspondingly operates to exhaust fluid under pressure from the brake cylinders 13 at a rapid rate.

Upon the exhaust of fluid under pressure from the brake cylinders 13, the slipping wheels promptly cease to decelerate at a slipping rate and begin to accelerate at a rate exceeding ten miles per hour per second.

The reduction in the rate of deceleration of the slipping wheels sufficiently below ten miles per hour per second causes drop-out of the relay 38 which, in turn, is effective to interrupt the circuit for energizing the magnet winding of the magnet valve 24. The control valve mechanism 19 is accordingly conditioned to resupply fluid under pressure to the control chamber of the relay valve device 18 at a restricted rate.

As in the case of acceleration of the car wheels at a rate exceeding ten miles per hour per second during propulsion, so also during a brake application acceleration of the slipping wheels back toward a speed corresponding to vehicle speed following the release of the brakes causes the corresponding one of the relays 39 to be picked-up.

The operation of the signal device 44, the sander 45, and the interruption of the power-interlock circuit 47 is the same as previously described for propulsion of the vehicle and need not be repeated. However, since the propulsion circuit is not established during braking, the interruption of the propulsion circuit by operation of the interlock contact c of the relay 43 is without effect. The operation of the sander 45, however, is effective to cause sanding which in turn assists in causing the rapid restoration of the slipping wheels back to a speed corresponding to car speed. Furthermore, in view of the fact that fluid under pressure is being resupplied to the brake cylinders 13 during the acceleration of the slipping wheels, sanding of the rails tends to prevent a recurrence of slipping due to reapplication of the brakes.

If upon reapplication of the brakes, either one or both of the wheels again begin to slip, the above operation is repeated so that at no time are the wheels permitted to decelerate to a locked condition and slide.

When the car or train comes to a complete stop following application of the brakes, the brake cylinders 13 are always charged to a pressure corresponding to that established in the control pipe 15 because the control valve mechanism 19 is always restored to its normal condition at such time.

When it is desired to release the brakes prior to again starting the car or train, the operator simply restores the brake valve handle 16a to its brake release position. The pressure in the control pipe 14 is accordingly reduced to atmospheric pressure by exhaust of fluid under pressure through the exhaust port 20 at the brake valve. The pressure in the control chamber of the relay valve device 18 is thus correspondingly reduced to atmospheric pressure and the relay valve device 18 thus operated to exhaust fluid under pressure from the brake cylinders 13 to effect the complete release of the brakes.

If the car or train is to be stopped for any length of time, the operator may open switch 35 thereby disconnecting the bus wire 33 from the positive terminal of the battery 31. The circuit for energizing the primary windings 51 of the generators 26 is thus interrupted and the unnecessary drainage of current from the battery 31 thereby prevented.

Summary

Summarizing, it will be seen that I have disclosed a novel arrangement adapted to function in response to the slipping of a vehicle wheel due either to excessive braking or excessive propulsion torque for causing rapid termination of the slipping condition.

In the event of slipping of the wheels during propulsion, visual or audible indicating means is operated to indicate the slipping condition, sanding of the wheels in advance of the wheels is effected and the supply of current to the propulsion motors or the supply of steam to the cylinders of a steam locomotive automatically interrupted as long as the slipping condition endures.

In the event of slipping of the wheels due to excessive braking, the brakes are automatically released and then reapplied at a restricted rate when the rotative deceleration of the slipping wheels is sufficiently reduced. Visual or audible indicating means is operated and sanding is effected in response to the acceleration of the slipping wheels back toward a speed corresponding to car speed.

Having now described my invention, what I claim as new and desire to secure by Letters Patent, is:

1. In a propulsion control system for a vehicle having a driving wheel to which propulsion torque may be applied the combination of means responsive only to the acceleration of the wheel at a rate exceeding a certain rate occurring only when the wheel slips, and means controlled by the acceleration responsive means for causing sanding in advance of the wheel only as long as said wheel accelerates at a rate exceeding said certain rate.

2. In a propulsion control system for a vehicle having a driving wheel to which propulsion torque may be applied, the combination of means responsive only to the acceleration of the wheel at a rate exceeding a certain rate occurring only when the wheel slips, and means controlled by the acceleration responsive means for causing cessation of application of propulsion torque to the wheel and for effecting sanding in advance of the wheel only as long as the wheel accelerates at a rate exceeding said certain rate.

3. In a braking and propulsion control system for a vehicle having a driving wheel on which brakes may be applied and on which propulsion torque may be exerted, the combination of means responsive to the rate of deceleration and of acceleration of the wheel, means controlled by said responsive means and operative during application of the brakes for effecting a release of the brakes on said wheel as long as the wheel decelerates at a rate exceeding a certain rate occurring only when the wheel slips and for effecting sanding in advance of the wheel as long as the wheel accelerates at a rate exceeding a certain rate occurring only when the wheel slips, and means controlled by the said responsive means and effective while propulsion torque is being applied to the wheel for causing cessation of application of propulsion torque to the wheel and sanding as long as the acceleration of the wheel exceeds a certain rate occurring only when the wheel slips.

4. In a vehicle having a driving wheel on which propulsion torque may be exerted, the combination of means for supplying a voltage substantially proportional to the rotational speed of the wheel, means operatively responsive only to an increase in the voltage supplied by the voltage supply means at a rate exceeding a certain rate occurring only when the wheel slips, and means controlled by said responsive means for effecting sanding in advance of the vehicle wheel.

5. In a vehicle having a driving wheel on which propulsion torque may be exerted, the combination of means for supplying a voltage substantially proportional to the rotational speed of the wheel, means operatively responsive only to an increase in the voltage supplied by the voltage supply means at a rate exceeding a certain rate occurring only when the wheel slips, and means controlled by the said responsive means and effective as long as the said responsive means is operated for causing cessation of application of propulsion torque to the wheel and for causing sanding in advance of the wheel.

6. In a vehicle having a driving wheel on which propulsion torque may be exerted, the combination of means for supplying an alternating-current voltage varying in effective value substantially proportionally to the rotational speed of the wheel, a rectifier for rectifying the alternating-current voltage, a circuit connected across the output terminals of the rectifier and including a condenser and the winding of a relay, said relay winding being so designed as to cause operation of the relay only in response to a current exceeding a certain value caused by an increase in the direct-current voltage and supplied in the said circuit to charge said condenser and corresponding to the rotative acceleration of the wheel at a rate exceeding a certain rate occurring only when the wheel slips, and means controlled by said relay and effective to cause sanding in advance of the wheel as long as said relay remains operated.

7. In a vehicle having a driving wheel on which propulsion torque may be exerted, the combination of means for supplying an alternating-current voltage varying in effective value substantially proportionally to the rotational speed of the wheel, a rectifier for rectifying the alternating-current voltage, a circuit connected across the output terminals of the rectifier and including a condenser and the winding of a relay, said relay winding being so designed as to cause operation of the relay only in response to a current exceeding a certain value caused by an increase in the direct-current voltage and supplied in the said circuit to charge said condenser and corresponding to the rotative acceleration of the wheel at a rate exceeding a certain rate occurring only when the wheel slips, and means controlled by said relay and effective to cause cessation of the application of propulsion torque to said wheel and also for causing sanding in advance of the wheel as long as said relay remains operated.

8. In a vehicle having a driving wheel on which brakes may be applied and on which propulsion torque may be exerted, the combination of means for supplying a direct-current voltage substantially proportional to the rotational speed of the wheel; two relays each of which has a winding; a resistor; a condenser; the winding of said relays and said resistor being connected in serial relation in a circuit subject to the direct-current voltage supplied by the voltage supply means; said condenser being connected in shunt relation to said resistor and the winding of one of said relays; the arrangement being such that one of said relays is picked-up in response to a condenser charging current produced upon an increase in the direct-current voltage at a rate exceeding a certain rate and corresponding to a certain rate of rotative acceleration of the said wheel; the other of said relays being picked-up only in response to current discharged from said condenser exceeding a certain value and produced in response to the reduction of the direct-current voltage at a rate exceeding a certain rate and corresponding to a certain rate of rotative deceleration of the wheel; means controlled by said one relay effective while propulsion torque is being applied to the wheel for effecting cessation of application of the propulsion torque to the wheel as long as the said one relay remains picked-up; and means controlled by the other of said relays and effective during an application of the brakes to effect a continuing reduction in the degree of application of the brakes as long as the said other relay remains picked-up.

9. In a vehicle having a driving wheel on which brakes may be applied and on which propulsion torque may be exerted, the combination of means for supplying a direct-current voltage substantially proportional to the rotational speed of the wheel; two relays each of which has a winding; a resistor; a condenser; the windings of said relays and said resistor being connected in serial relation in a circuit subject to the direct-current voltage supplied by the voltage supply means; said condenser being connected in shunt relation to said resistor and the winding of one of said relays; the arrangement being such that one of said relays is picked-up in response to a condenser charging current produced upon an increase in the direct-current voltage at a rate exceeding a certain rate and corresponding to a certain rate of rotative acceleration of the said wheel; the other of said relays being picked-up only in response to current discharged from said condenser exceeding a certain value and produced in response to the reduction of the direct-current voltage at a rate exceeding a certain rate and corresponding to a certain rate of rotative deceleration of the wheel; means effective both during an application of the brakes and while propulsion torque is being applied to said wheel for causing sanding in advance of the wheel as long as said one relay remains picked-up, and means controlled by said other relay effective during an application of the brakes to cause a continuing reduction in the degree of application of the brakes as long as said other relay remains picked-up.

10. In a vehicle having a driving wheel on which brakes may be applied and on which propulsion torque may be exerted, the combination of means for supplying a direct-current voltage substantially proportional to the rotational speed of the wheel; two relays each of which has a winding; a resistor; a condenser; the windings of said relays and said resistor being connected in serial relation in a circuit subject to the direct-current voltage supplied by the voltage supply means; said condenser being connected in shunt relation to said resistor and the winding of one of said relays; the arrangement being such that one of said relays is picked-up in response to a condenser charging current produced upon an increase in the direct-current voltage at a rate exceeding a certain rate and corresponding to a certain rate of rotative acceleration of the said wheel; the other of said relays being picked-up only in response to current discharged from said condenser exceeding a certain value and produced in response to the reduction of the direct-current voltage at a rate exceeding a certain rate and corresponding to a certain rate of rotative deceleration of the wheel; means operative to cause sanding in advance of said wheel; means controlled by said one relay and effective while propulsion torque is being applied to said wheel for causing cessation of application of propulsion torque to the wheel and the operation of said sanding means as long as said one relay is picked-up; means controlled by said one relay and effective during an application of the brakes for causing operation of said sanding means as long as the acceleration of said wheel exceeds a certain rate; and means controlled by said other relay and effective during an application of the brakes for causing a continuing reduction in the degree of application of the brakes as long as said other relay remains picked-up.

11. In a vehicle brake and propulsion control system for a vehicle having a wheel on which the brakes may be applied and on which propulsion torque may be exerted, the combination of means for supplying a direct-current voltage substantially proportional to the rotational speed of the wheel, a circuit including a condenser in which current flows to charge the condenser proportional to the rate of increase of said voltage and in which current discharged from the condenser flows substantially proportional to the rate of reduction of said voltage, a first relay having a winding effective only when energized by a condenser charging current exceeding a certain value for causing pick-up of the relay, a second relay having a winding effective only when energized by current discharged from the condenser exceeding a certain value for causing pick-up of the relay, means controlled by said first relay and effective during propulsion of the vehicle to cause cessation of application of propulsion torque to said wheel as long as said first relay remains picked-up, and means controlled by said second relay and effective during an application of the brakes for causing a continued reduction in the degree of application of the brakes as long as said second relay remains picked-up.

12. In a propulsion control system for a vehicle of the type having a driving wheel to which propulsion torque is applied by a propulsion motor to which current is supplied by a supply circuit, the combination of means responsive only to the positive acceleration of the wheel at a rate exceeding a certain rate occurring only when the wheel slips, and means controlled by the acceleration responsive means for interrupting the supply circuit of the propulsion motor whereby to prevent the application of propulsion torque to the wheel so long as the wheel accelerates at a rate exceeding said certain rate.

13. In a braking and propulsion control for a vehicle of the type having a driving wheel on which brakes may be applied and on which propulsion torque is exerted by a propulsion motor having a current supply circuit, the combination of means responsive to the rate of deceleration and of acceleration of the wheel, means controlled by said responsive means and operative during an application of the brakes to effect a reduction in the degree of application of the brakes as long as the rate of deceleration of the wheel exceeds a certain rate occurring only when the wheel slips, and means controlled by said responsive means and effective while propulsion torque is being applied to the wheel for interrupting the current supply circuit of the propulsion motor whereby to prevent the application of propulsion torque to the wheel as long as the wheel rotatively accelerates at a rate exceeding a certain rate occurring only when the wheel slips.

14. In a vehicle propulsion control system for a vehicle of the type having a driving wheel on which propulsion torque is exerted by a propulsion motor having a current supply circuit, the combination of means for supplying a voltage substantially proportional to the rotational speed of the wheel, means operatively responsive only to an increase in the voltage supplied by the voltage supply means at a rate exceeding a certain rate occurring only when the wheel slips, and means controlled by said responsive means for interrupting the supply circuit of the propulsion motor to prevent the application of propulsion torque on said wheel.

15. In a propulsion control system for a vehicle of the type having a driving wheel on which propulsion torque is exerted by a propulsion motor having a current supply circuit, the combination of means for supplying an alternating current voltage varying in effective value substantially proportionally to the speed of the wheel, a rectifier for rectifying the alternating-current voltage, a circuit connected across the output terminals of the rectifier and including a condenser and the winding of a relay, said relay winding being so designed as to cause pick-up operation of the relay only in response to a current exceeding a certain value supplied in the said rectifier circuit to charge said condenser as a result of an increase in the direct-current output voltage of the rectifier at a rate exceeding a certain rate and corresponding to the rotative acceleration of the wheel at a rate exceeding a certain rate which occurs only when the wheel slips, said relay being effective in its picked-up position to interrupt the supply circuit for the propulsion motor whereby to prevent the application of propulsion torque to the wheel so long as said relay remains picked-up.

JOSEPH C. McCUNE.